(12) United States Patent
Xu et al.

(10) Patent No.: US 11,216,125 B2
(45) Date of Patent: Jan. 4, 2022

(54) TOUCH SUBSTRATE AND METHOD FOR MANUFACTURING THE SAME, AND DISPLAY DEVICE

(71) Applicants: HEFEI XINSHENG OPTOELECTRONICS TECHNOLOGY CO., LTD., Hefei (CN); BOE TECHNOLOGY GROUP CO., LTD., Beijing (CN)

(72) Inventors: Shifeng Xu, Beijing (CN); Tsung Chieh Kuo, Beijing (CN); Lei Zhang, Beijing (CN); Zouming Xu, Beijing (CN); Tengfei Zhong, Beijing (CN)

(73) Assignees: HEFEI XINSHENG OPTOELECTRONICS TECHNOLOGY CO., LTD., Hefei (CN); BOE TECHNOLOGY GROUP CO., LTD., Beijing (CN)

(*) Notice: Subject to any disclaimer, the term of this patent is extended or adjusted under 35 U.S.C. 154(b) by 450 days.

(21) Appl. No.: 16/339,099

(22) PCT Filed: Sep. 28, 2018

(86) PCT No.: PCT/CN2018/108202
§ 371 (c)(1),
(2) Date: Apr. 3, 2019

(87) PCT Pub. No.: WO2019/100848
PCT Pub. Date: May 31, 2019

(65) Prior Publication Data
US 2021/0357074 A1    Nov. 18, 2021

(30) Foreign Application Priority Data

Nov. 24, 2017   (CN) .......................... 201711191826.0

(51) Int. Cl.
*G06F 3/041* (2006.01)
*G06F 3/044* (2006.01)

(52) U.S. Cl.
CPC .......... *G06F 3/0443* (2019.05); *G06F 3/0446* (2019.05); *G06F 3/04164* (2019.05);
(Continued)

(58) Field of Classification Search
None
See application file for complete search history.

(56) References Cited

U.S. PATENT DOCUMENTS

2020/0117305 A1* 4/2020 Kim ........................ G06F 3/044

FOREIGN PATENT DOCUMENTS

| CN | 106293210 A | 1/2017 |
| CN | 106527801 A | 3/2017 |

(Continued)

OTHER PUBLICATIONS

PCT International Search Report, Application No. PCT/CN2018/108202, dated Dec. 19, 2018, 5 pages: with English translation.
(Continued)

*Primary Examiner* — Duane N Taylor, Jr.
(74) *Attorney, Agent, or Firm* — Armstrong Teasdale LLP (57) ABSTRACT

The embodiments of the present disclosure provide a touch substrate and a method for manufacturing the same, and a display device. The touch substrate includes a substrate, wherein a touch area of the substrate includes first to fourth sides, and a bonding area of the substrate has a fifth side opposite to the fourth side and a sixth side, a first touch electrode and a second touch electrode, a first wiring and a second wiring connected to the first touch electrode via the first side and the second side, respectively, a third wiring and a fourth wiring connected to the second touch electrode via the third side and the fourth side, respectively, and a pad.

20 Claims, 5 Drawing Sheets

(52) U.S. Cl.
CPC .............. *G06F 2203/04102* (2013.01); *G06F 2203/04103* (2013.01); *G06F 2203/04111* (2013.01)

(56) References Cited

FOREIGN PATENT DOCUMENTS

| CN | 107992239 A | 5/2018 |
|---|---|---|
| KR | 20160016391 A | 2/2016 |

OTHER PUBLICATIONS

PCT Written Opinion, Application No. PCT/CN2018/108202, dated Dec. 19, 2018, 6 pages.: with English translation of relevant part.
China First Office Action, Application No. 201711191826.0, dated Mar. 25, 2019, 12 pps.: with English translation.

* cited by examiner

TOUCH SUBSTRATE AND METHOD FOR MANUFACTURING THE SAME, AND DISPLAY DEVICE

CROSS REFERENCE TO RELATED APPLICATIONS

This patent application is a National Stage Entry of PCT/CN2018/108202 filed on Sep. 28, 2018, which claims the benefit and priority of Chinese patent application No. 201711191826.0 filed on Nov. 24, 2017, the disclosures of which are incorporated by reference herein in their entirety as part of the present application.

BACKGROUND

The present disclosure relates to the field of touch techniques, and in particular, to a touch substrate and a method for manufacturing the same, and a display device.

As a product for human-computer interaction, the touch substrate has been widely used in many fields of production and life, especially in the field of consumer electronic products (such as mobile phones, tablet computers, and even televisions) with the fastest development.

BRIEF DESCRIPTION

The embodiments of the present disclosure provide a touch substrate and a method for manufacturing the same, and a display device.

A first aspect of the present disclosure provides a touch substrate. The touch substrate includes a substrate having a touch area, a peripheral area surrounding the touch area, and a bonding area located in the peripheral area, wherein the touch area includes a first side and a second side opposite to each other, and a third side and a fourth side opposite to each other, the bonding area is opposite to the fourth side, and has a fifth side opposite to the fourth side and a sixth side opposite to the fifth side, a first touch electrode and a second touch electrode disposed on the substrate and located in the touch area, a first wiring and a second wiring disposed on the substrate and located in the peripheral area, wherein the first wiring is connected to the first touch electrode via the first side, and the second wiring is connected to the first touch electrode via the second side, a third wiring and a fourth wiring disposed on the substrate and located in the peripheral area, wherein the third wiring is connected to the second touch electrode via the third side, and the fourth wiring is connected to the second touch electrode via the fourth side, and a pad disposed along the fourth side and located in the bonding area, wherein the first wiring is connected to a first pad of the pad via the fifth side, and the fourth wiring is connected to a second pad of the pad via the fifth side, the second wiring connected to a same touch electrode as the first wiring is connected to the first pad via the sixth side, and the third wiring connected to a same touch electrode as the fourth wiring is connected to the second pad via the sixth side.

In the embodiment of the present disclosure, the first wiring and the fourth wiring do not intersect with each other, and the second wiring and the third wiring are disposed to be intersected with each other and insulated from each other.

In the embodiment of the present disclosure, the first touch electrode and the second touch electrode are disposed on different layers, the first wiring and the second wiring are disposed on a same layer as the first touch electrode, and the third wiring and the fourth wiring are disposed on a same layer as the second touch electrode.

In the embodiment of the present disclosure, the first pad is disposed on a same layer as the first wiring and the second wiring, and the second pad is disposed on a same layer as the third wiring and the fourth wiring.

In the embodiment of the present disclosure, the first touch electrode is disposed on a same layer as the second touch electrode.

In the embodiment of the present disclosure, the second wiring has a first portion and a second portion which are sequentially disposed along a connection path from the first touch electrode to the first pad, the first portion and the second portion are disposed on different layers, and the second portion intersects with the third wiring, wherein the first portion is disposed on a same layer as the third wiring.

In the embodiment of the present disclosure, the first wiring has a third portion and a fourth portion which are sequentially disposed along the connection path from the first touch electrode to the first pad, and the third portion and the fourth portion are disposed on different layers, wherein the third portion and the fourth wiring are disposed on a same layer as the first portion and the third wiring, and the fourth portion is disposed on a same layer as the second portion.

In the embodiment of the present disclosure, the first pad is disposed on a same layer as the fourth portion and the second portion, and the second pad is disposed on a same layer as the third wiring and the fourth wiring.

In the embodiment of the present disclosure, vertical projections of the third portion and the fourth portion on the substrate at least partially overlap with each other, and vertical projections of the first portion and the second portion on the substrate at least partially overlap with each other.

In the embodiment of the present disclosure, the second wiring and the third wiring vertically intersect with each other.

A second aspect of the present disclosure provides a method for manufacturing a touch substrate. The method includes providing a substrate having a touch area, a peripheral area surrounding the touch area, and a bonding area located in the peripheral area, wherein the touch area includes a first side and a second side opposite to each other, and a third side and a fourth side opposite to each other, the bonding area is opposite to the fourth side, and the bonding area has a fifth side opposite to the fourth side and a sixth side opposite to the fifth side, forming a first touch electrode and a second touch electrode on the substrate and in the touch area, forming a first wiring and a second wiring on the substrate and in the peripheral area, wherein the first wiring and the second wiring are connected to the first touch electrode via the first side and the second side, respectively, forming a third wiring and a fourth wiring on the substrate and in the peripheral area, wherein the third wiring and the fourth wiring are connected to the second touch electrode via the third side and the fourth side, respectively, and forming a pad along the fourth side in the bonding area, wherein the first wiring and the fourth wiring are connected to a first pad and a second pad of the pad via the fifth side of the bonding area, respectively, the second wiring connected to a same touch electrode as the first wiring, and the third wiring connected to a same touch electrode as the fourth wiring, are connected to the first pad and the second pad via the sixth side of the bonding area, respectively.

In the embodiment of the present disclosure, the first wiring and the fourth wiring do not intersect with each other, and the second wiring and the third wiring are disposed to be intersected with each other and insulated from each other.

In the embodiment of the present disclosure, the method includes forming a first conductive layer on the substrate, patterning the first conductive layer to form the first touch electrode, the first wiring, the second wiring, and the first pad, forming a first insulating layer on the first conductive layer, patterning the first insulating layer to form an opening exposing the first pad in the bonding area, forming a second conductive layer on the first insulating layer, patterning the second conductive layer to form the second touch electrode, the third wiring, the fourth wiring, and the second pad.

In the embodiment of the present disclosure, the first wiring has a third portion and a fourth portion which are sequentially disposed along a connection path from the first touch electrode to the first pad, the second wiring has a first portion and a second portion which are sequentially disposed along the connection path from the first touch electrode to the first pad, and the second portion intersects with the third wiring, the method includes forming a third conductive layer on the substrate, patterning the third conductive layer to form the fourth portion, the first pad, the second portion, and a bridging portion located in the touch area, wherein the fourth portion, the first pad, and the second portion are integrally formed, forming a second insulating layer on the third conductive layer, wherein the second insulating layer has a first opening exposing the fourth portion and a second opening exposing the second portion, forming a fourth conductive layer on the second insulating layer, patterning the fourth conductive layer to form the first touch electrode and the second touch electrode, wherein the first touch electrode includes a plurality of first touch sub-electrodes connected directly, and the second touch electrode includes a plurality of second touch sub-electrodes arranged at intervals and the second touch electrode are connected by the bridging portion, the second insulating layer has a third opening exposing the second touch sub-electrodes, further forming a fifth conductive layer on the second insulating layer, patterning the fifth conductive layer to form the third portion, the first portion, the third wiring, the fourth wiring, and the second pad, wherein the fourth portion is connected to the third portion via the first opening, the second portion is connected to the first portion via the second opening, and the second touch sub-electrodes are connected to each other by the bridging portion via the third opening.

In the embodiment of the present disclosure, the first wiring has a third portion and a fourth portion which are sequentially disposed along a connection path from the first touch electrode to the first pad, and the second wiring has a first portion and a second portion which are sequentially disposed along the connection path from the first touch electrode to the first pad, the method includes forming a sixth conductive layer on the substrate, patterning the sixth conductive layer to form the first touch electrode, the second touch electrode, the fourth portion, the first pad, and the second portion, wherein the fourth portion, the first pad, and the second portion are integrally formed, the first touch electrode includes a plurality of first touch sub-electrodes connected directly, and the second touch electrode includes a plurality of second touch sub-electrodes arranged at intervals, forming a third insulating layer on the sixth conductive layer, wherein the third insulating layer has a fourth opening exposing the fourth portion, a fifth opening exposing the second portion, and a sixth opening exposing the second touch sub-electrodes, forming a seventh conductive layer on the third insulating layer, patterning the seventh conductive layer to form a bridging portion located in the touch area, the third portion, the first portion of the second wiring, the third wiring, the fourth wiring, and the second pad, wherein the fourth portion is connected to the third portion via the fourth opening, the second portion is connected to the first portion via the fifth opening, and the second touch sub-electrodes are connected to each other by the bridging portion via the sixth opening.

A third aspect of the present disclosure provides a display device. The display device includes any touch substrate described in the first aspect of the present disclosure.

Further adaptive aspects and scope will become apparent from the description provided herein. It should be understood that various aspects of the present application may be implemented alone or in combination with one or more other aspects. It should also be understood that the description and specific embodiments herein are intended to be illustrative and not limiting the scope of this application.

BRIEF DESCRIPTION OF THE DRAWINGS

The drawings described herein are only for the purpose of illustrations of the selected embodiments rather than any possible implementation, and they are not intended to limit the scope of this application, in which.

DETAILED DESCRIPTION

Various embodiments will now be described in detail with reference to the drawings, and those embodiments are provided as exemplary embodiments of the present disclosure to enable persons skilled in the art to implement the technical solutions of the present disclosure.

It should be noted that the following drawings and examples are not intended to limit the scope of the present disclosure. In the case where specific elements of the present disclosure can be partially or entirely implemented using known components (or methods or processes), only those portions of such known components (or methods or processes) necessary to understand the present disclosure will be described, and detailed descriptions of other portions of such known components will be omitted so as not to obscure the technical solutions of the present disclosure. Further, various embodiments include equivalents known at present and in future, which are equivalent to the components concerned herein, by means of illustration.

The flow diagram described in the present disclosure is just one example. There may be many modifications to the flow diagram or the steps described therein without departing from the spirit of the present disclosure. For example, the steps may be performed in a different order, or the steps may be added, deleted, or amended. These modifications are considered as parts of the claimed aspects.

In the description of the present disclosure, the orientations or positional relations indicated by the terms "on", "above", "under", "below", "between", etc. are those illustrated based on the drawings. They are just used to facilitate and simplify the description of the present disclosure, rather than indicating or implying that any mentioned device or element must have a particular orientation, or be constructed or operated in a particular orientation, and hence cannot be construed as limitations to the present disclosure. In addition, when an element or layer is referred to as being "on" another element or layer, it may be directly located on the another element or layer, or there may be an intermediate element or layer; similarly, when an element or layer is referred to as being "under" another element or layer, it may be directly located under the another element or layer, or there may be at least one intermediate element or layer; and when an element or layer is referred to as being "between" two elements or layers, it may be an unique element or layer between the two elements or layers, or there may be more than one intermediate element or layer.

Unless additionally and explicitly pointed out in the context, the singular form of the words used herein and in the appended claims includes the plural form, and vice versa. Thus, when a word is mentioned in the singular form, it usually includes the plural form. Similarly, the words "include", "comprise", "contain", "have" and grammatical modifications thereof are intended to be inclusive and indicate that there may be additional elements in addition to the listed elements. Where the term "example" is used herein, and particularly following a group of terms, it is merely exemplary and illustrative, and should not be considered as exclusive or extensive. The terms "first", "second", "third" and the like are just used for description, and should not be understood as indicating or implying any relative importance or formation order.

In addition, in the description of the present disclosure, when two elements are referred to as being disposed on a same layer, it means that they are located on the surface of a same film layer. When two elements are referred to as being disposed on different layers, it means that they are located on the surfaces of different film layers. When two elements are referred to as intersecting with each other, it may mean that the vertical projections of the two elements on the substrate at least partially overlap with each other.

A structure of a touch substrate includes touch electrodes and metal wirings. The touch electrodes are connected to a pad in a bonding area via the metal wirings, and then the pad is connected to an IC on a printed circuit board via a flexible circuit board. With respect to a large-sized touch substrate, for the purpose of reducing the channel impedance and the charging time, such an arrangement may be adopted that the driving channels are located on the two sides of the substrate and the receiving channels are located on one side of the substrate, or the driving channels and the receiving channels are both located on the two sides of the substrate.

In a traditional touch substrate, in case of the two-sided or one-sided arrangement, neither the driving channels connected to a same touch electrode, nor the receiving channels connected to a same touch electrode are connected. Since the IC on the printed circuit board has only one pin corresponding to each channel, a jumper design is required on the printed circuit board. However, the jumper design must employ a double-layer printed circuit board, which increases the amount of the anisotropic conductive film (ACF) and the cost of the touch substrate.

Figure 1:
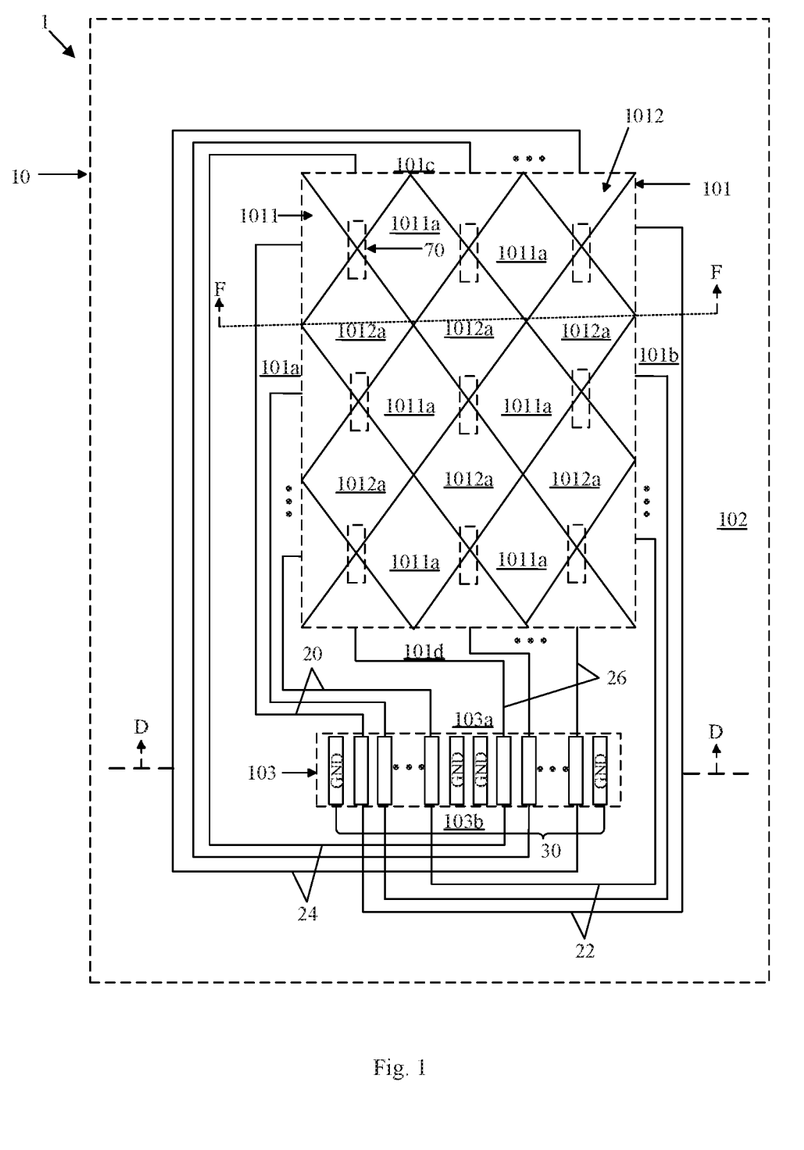
FIG. 1 illustrates a schematic diagram of a touch substrate according to an embodiment of the present disclosure.

FIG. 1 illustrates a schematic diagram of a touch substrate 1 according to an embodiment of the present disclosure. As illustrated in FIG. 1, the touch substrate 1 includes a substrate 10. The substrate 10 may have a touch area 101, a peripheral area 102 surrounding the touch area 101, and a bonding area 103 located in the peripheral area 102. The touch area 101 may include a first side 101a and a second side 101b opposite to each other, and a third side 101c and a fourth side 101d opposite to each other. The bonding area 103 is opposite to the fourth side 101d, and has a fifth side 103a opposite to the fourth side 101d and a sixth side 103b opposite to the fifth side 103a.

According to the embodiment of the present disclosure, the touch substrate 1 further includes a first touch electrode 1011, a second touch electrode 1012, a first wiring 20, a second wiring 22, a third wiring 24, a fourth wiring 26, and a pad 30. The first touch electrode 1011 and the second touch electrode 1012 may be configured to sense a touch to generate a touch signal. The first wiring 20, the second wiring 22, the third wiring 24, and the fourth wiring 26 may be respectively connected to corresponding touch electrodes and the pad 30 to transmit the generated touch signal, thereby performing a touch recognition.

As illustrated in FIG. 1, the first touch electrode 1011 and the second touch electrode 1012 are disposed on the substrate 10 and located in the touch area 101. The first wiring 20 and the second wiring 22 are disposed on the substrate 10 and located in the peripheral area 102. The first wiring 20 and the second wiring 22 are connected to the first touch electrode 1011 via the first side 101a and the second side 101b, respectively. The third wiring 24 and the fourth wiring 26 are disposed on the substrate 10 and located in the peripheral area 102. The third wiring 24 and the fourth wiring 26 are connected to the second touch electrode 1012 via the third side 101c and the fourth side 101d, respectively. The pad 30 is located in the bonding area 103 and disposed along the fourth side 101d.

Figure 2:
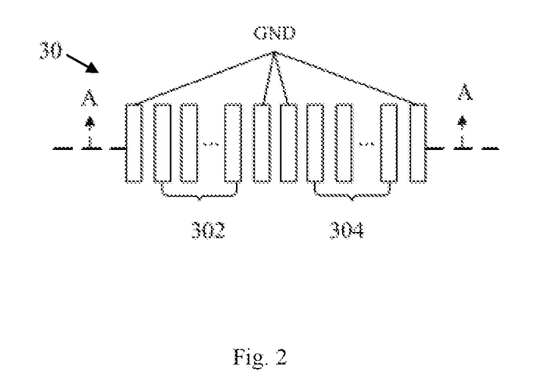
FIG. 2 illustrates a schematic diagram of a specific structure of a pad of the touch substrate illustrated in FIG. 1.

FIG. 2 illustrates a schematic diagram of a specific structure of the pad 30 of the touch substrate 1 illustrated in FIG. 1. Specifically, the pad 30 may include a first pad 302, a second pad 304, and a ground pad GND.

In this embodiment, the first wiring 20 and the fourth wiring 26 are connected to the first pad 302 and the second pad 304 of the pad 30 via the fifth side 103a of the bonding area 103, respectively. The second wiring 22 connected to the same first touch electrode 1011 as the first wiring 20 is connected to the first pad 302 via the sixth side 103b of the bonding area 103. The third wiring 24 connected to the same second touch electrode 1012 as the forth wiring 26 is connected to the second pad 304 via the sixth side 103b of the bonding area 103.

According to the embodiment of the present disclosure, the first wiring 20 and the fourth wiring 26 do not intersect with each other, and the second wiring 22 and the third wiring 24 are disposed to be intersected with each other and insulated from each other to avoid a short circuit.

According to the embodiment of the present disclosure, the touch substrate 1 may further include a ground line (not illustrated) connected to the ground pad GND. The ground line separates the first wiring 20, the second wiring 22, the third wiring 24, and the fourth wiring 26 adjacent to each other to avoid mutual interference of the touch signals.

According to the embodiment of the present disclosure, the touch substrate 1 may further include a flexible circuit board (not illustrated) connected to the pad 30.

As can be seen from the above description, by connecting the first wiring 20 and the second wiring 22, which are connected to the same first touch electrode 1011, to the first pad 302, and connecting the third wiring 24 and the fourth wiring 26, which are connected to the same second touch electrode 1012, to the second pad 304, a number of the pads 30 on the touch substrate 1 and the area of the flexible circuit board can be reduced, which saving the space while decreasing the cost of the touch substrate.

Figure 3:
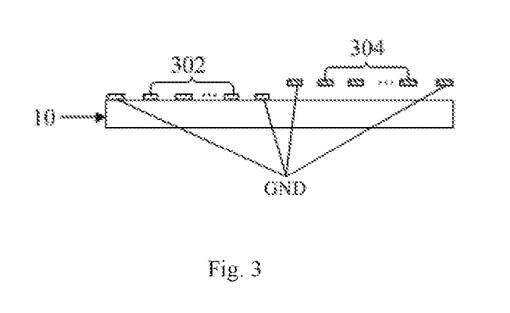
FIG. 3 illustrates a cross-sectional view of the pad illustrated in FIG. 2 along line A-A.

FIG. 3 illustrates a cross-sectional view of the pad 30 illustrated in FIG. 2 along Line A-A. According to one embodiment of the present disclosure, the first touch electrode 1011 and the second touch electrode 1012 may be disposed on different layers. According to the embodiment of the present disclosure, an insulating layer (not illustrated) may also be disposed between the first touch electrode 1011 and the second touch electrode 1012 to insulatively separate the first touch electrode 1011 and the second touch electrode 1012. The first touch electrode 1011 and the second touch electrode 1012 may be mesh structures. In this embodiment, the first wiring 20 and the second wiring 22 may be disposed on a same layer as the first touch electrode 1011, and they may be made of a same material (for example, metal) and formed by one patterning process with a mask. The third wiring 24 and the fourth wiring 26 may be disposed on a same layer as the second touch electrode 1012, and similarly, they may be made of a same material (for example, metal) and formed by one patterning process with a mask.

According to the embodiment of the present disclosure, the first pad 302 may be disposed on a same layer as the first wiring 20 and the second wiring 22, and the second pad 304 may be disposed on a same layer as the third wiring 24 and the fourth wiring 26. Since the first touch electrode 1011 and the second touch electrode 1012 are disposed on different layers, the first pad 302 and the second pad 304 are disposed on different layers (as illustrated in FIG. 3).

According to the embodiment of the present disclosure, the insulating layer may be provided with an opening in the bonding area 103 to connect the flexible circuit board with the pad 30.

It should be noted that in FIG. 3, although the second pad 304 is illustrated as being suspended above the substrate 10, since the second pad 304 is connected to the third wiring 24 and the fourth wiring 26, and the third wiring 24 and the fourth wiring 26 are disposed on the insulating layer, the second pad 304 may be supported by the insulating layer.

According to the embodiment of the present disclosure, the second wiring 22 may vertically intersect with the third wiring 24 to avoid mutual interference of the touch signals.

As can be seen from the above description, since the first wiring 20 and the second wiring 22 are disposed on a layer different from that where the third wiring 24 and the fourth wiring 26 are disposed, those wirings do not intersect with each other in a same layer. By connecting the first wiring 20 and the second wiring 22, which are connected to the same first touch electrode 1011, to the first pad 302, and connecting the third wiring 24 and the fourth wiring 26, which are connected to the same second touch electrode 1012, to the second pad 304, the number of the pads 30 on the touch substrate 1 and the area of the flexible circuit board can be reduced, thereby saving the space and decreasing the cost of the touch substrate.

Figure 4:
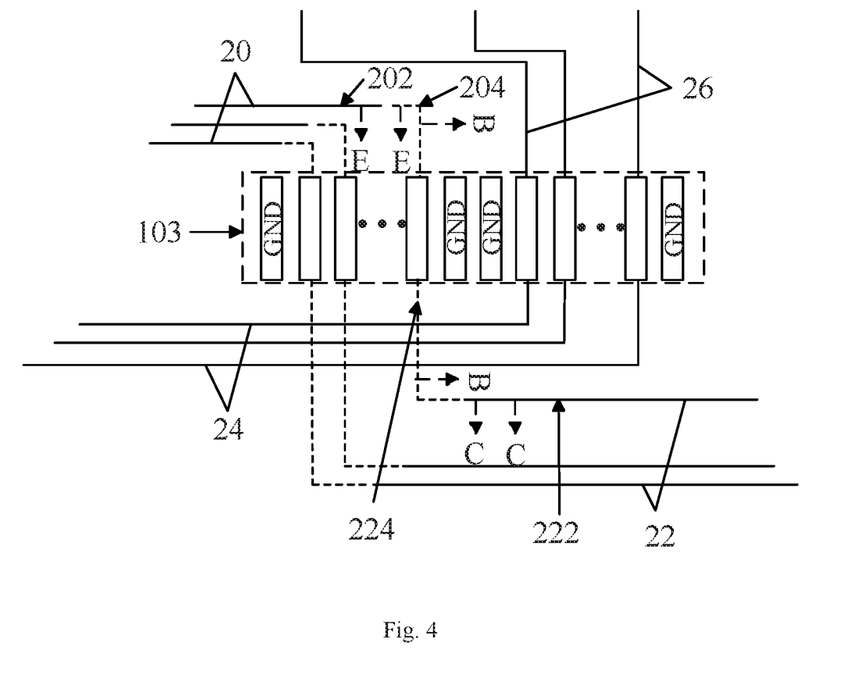
FIG. 4 illustrates a schematic diagram of a partial portion of a touch substrate according to another embodiment of the present disclosure.
Figure 5:
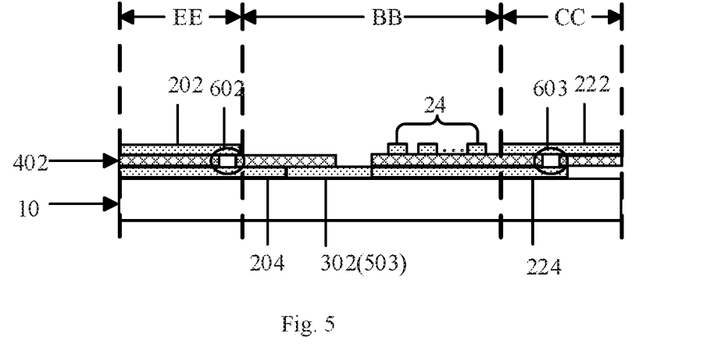
FIG. 5 illustrates cross-sectional views of the partial portion of the touch substrate illustrated in FIG. 4 along line B-B, line C-C, and line E-E.

FIG. 4 illustrates a schematic diagram of a partial portion of the touch substrate 1 according to an embodiment of the present disclosure. FIG. 5 illustrates cross-sectional views of the partial portion of the touch substrate 1 as illustrated in FIG. 4 along Line B-B, Line C-C, and Line E-E. According to another embodiment of the present disclosure, the first touch electrode 1011 may also be disposed on the same layer as the second touch electrode 1012. As illustrated in FIG. 4, the second wiring 22 may have a first portion 222 and a second portion 224 (indicated by the dashed lines in FIG. 4) which are sequentially disposed along a connection path from the first touch electrode 1011 to the first pad 302. In this embodiment, in order to prevent the second wiring 22 and the third wiring 24 from intersecting with each other in a same layer and causing a short circuit, the following arrangement is made. As illustrated in FIG. 5, the first portion 222 of the second wiring 22 and the second portion 224 of the second wiring 22 are disposed on different layers, and an insulating layer 402 may be disposed therebetween. In addition, the second portion 224 of the second wiring 22 intersects with the third wiring 24, i.e., the vertical projections of them on the substrate 10 at least partially overlap with each other. The first portion 222 of the second wiring 22 is disposed on the same layer as the third wiring 24.

According to the embodiment of the present disclosure, as illustrated in FIG. 4, the first wiring 20 has a third portion 202 and a fourth portion 204 (indicated by the dashed lines in FIG. 4) which are sequentially disposed along the connection path from the first touch electrode 1011 to the first pad 302. The third portion 202 of the first wiring 20 and the fourth portion 204 of the first wiring 20 may be disposed on different layers. Similar to the arrangement of the first portion 222 and the second portion 224 of the second wiring 22, specifically, the third portion 202 of the first wiring 20 and the fourth wiring 26 are disposed on a same layer as the first portion 222 of the second wiring 22 and the third wiring 24. In this embodiment, the fourth portion 204 of the first wiring 20 is disposed on a same layer as the second portion 224 of the second wiring 22. Through the above arrangement, the first wiring 20 and the second wiring 22, which are connected to the same first touch electrode 1011, are connected to the first pad 302.

According to the embodiment of the present disclosure, as illustrated in FIG. 5, the first pad 302 is disposed on a same layer as the fourth portion 204 of the first wiring 20 and the second portion 224 of the second wiring 22. The second pad 304 is disposed on a same layer as the third wiring 24 and the fourth wiring 26.

According to the embodiment of the present disclosure, the vertical projections of the third portion 202 and the fourth portion 204 of the first wiring 20 on the substrate 10 at least partially overlap with each other. The vertical projections of the first portion 222 and the second portion 224 of the second wiring 22 on the substrate 10 at least partially overlap with each other. At the overlap area, the insulating layer 402 may be provided with openings 602 and 603. The opening may be filled with a conductive material to conductively connect the third portion 202 and the fourth portion 204 of the first wiring 20 with each other, and conductively connect the first portion 222 and the second portion 224 of the second wiring 22 with each other.

According to the embodiment of the present disclosure, the second portion 224 of the second wiring 22 may vertically intersect with the third wiring 24 to avoid mutual interference of the touch signals.

As can be seen from the above description, since the first touch electrode 1011 and the second touch electrode 1012 are disposed on a same layer, the second wiring 22 and the third wiring 24 can be prevented from intersecting with each other in a same layer, by virtue of the above arrangement. By connecting the first wiring 20 and the second wiring 22, which are connected to the same first touch electrode 1011, to the first pad 302, and connecting the third wiring 24 and the fourth wiring 26, which are connected to the same second touch electrode 1012, to the second pad 304, the number of the pads 30 on the touch substrate 1 and the area of the flexible circuit board can be reduced, thereby saving the space and decreasing the cost of the touch substrate.

Figure 6:
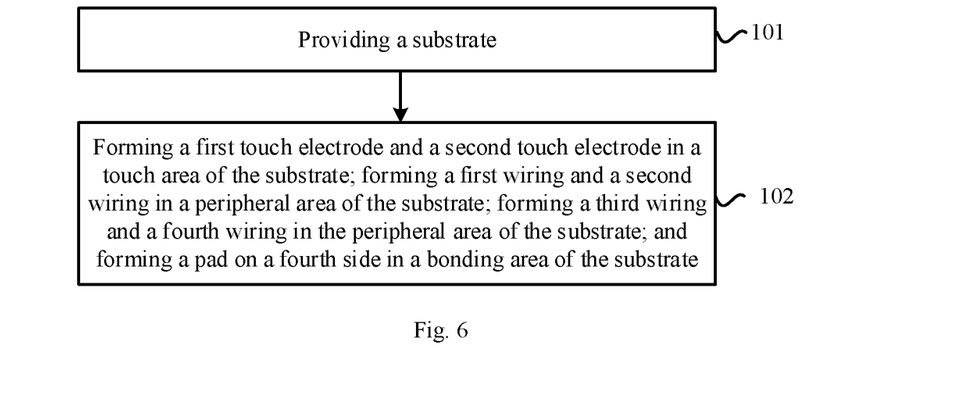
FIG. 6 illustrates a flow diagram of a method for manufacturing a touch substrate according to an embodiment of the present disclosure.

In another aspect of the present disclosure, there is provided a method for manufacturing a touch substrate described herein. FIG. 6 illustrates a flow diagram of a method for manufacturing a touch substrate according to an embodiment of the present disclosure.

The method for manufacturing the touch substrate (as illustrated in FIG. 1) may include the following steps:

S101: providing a substrate 10;

S102: forming a first touch electrode 1011 and a second touch electrode 1012 in a touch area 101 of the substrate 10, forming a first wiring 20 and a second wiring 22 in a peripheral area 102 of the substrate 10, forming a third wiring 24 and a fourth wiring 26 in the peripheral area 102 of the substrate 10, and forming a pad 30 on a fourth side 101d in a bonding area 103 of the substrate 10.

In this embodiment, the substrate 10 has a touch area 101, a peripheral area 102 surrounding the touch area 101, and a bonding area 103 located in the peripheral area 102. Specifically, the touch area 101 includes a first side 101a and a second side 101b opposite to each other, a third side 101c and a fourth side 101d opposite to each other. The bonding area 103 is opposite to the fourth side 101d, and has a fifth side 103a opposite to the fourth side 101d and a sixth side 103b opposite to the fifth side 103a. The first wiring 20 and the second wiring 22 are connected to the first touch electrode 1011 via the first side 101a and the second side 101b, respectively. The third wiring 24 and the fourth wiring 26 are connected to the second touch electrode 1012 via the third side 101c and the fourth side 101d, respectively. In addition, as illustrated in FIG. 2, the first wiring 20 and the fourth wiring 26 are connected to the first pad 302 and the second pad 304 of the pad 30 via the fifth side 103a of the bonding area 103, respectively. In this embodiment, the second wiring 22 connected to a same touch electrode as the first wiring 20, and the third wiring 24 connected to a same touch electrode as the fourth wiring 26, are connected to the first pad 302 and the second pad 304 via the sixth side 103b of the bonding area 103, respectively.

According to the embodiment of the present disclosure, the first wiring 20 and the fourth wiring 26 may not intersect with each other, the second wiring 22 and the third wiring 24 may be disposed to be intersected with each other and insulated from each other to avoid a short circuit.

As can be seen from the above description, by connecting the first wiring and the second wiring, which are connected to the same first touch electrode, to the first pad, and connecting the third wiring and the fourth wiring, which are connected to the same second touch electrode, to the second pad, the number of the pads on the touch substrate and the area of the flexible circuit board can be reduced, thereby saving the space and decreasing the cost of the touch substrate.

Figure 8:
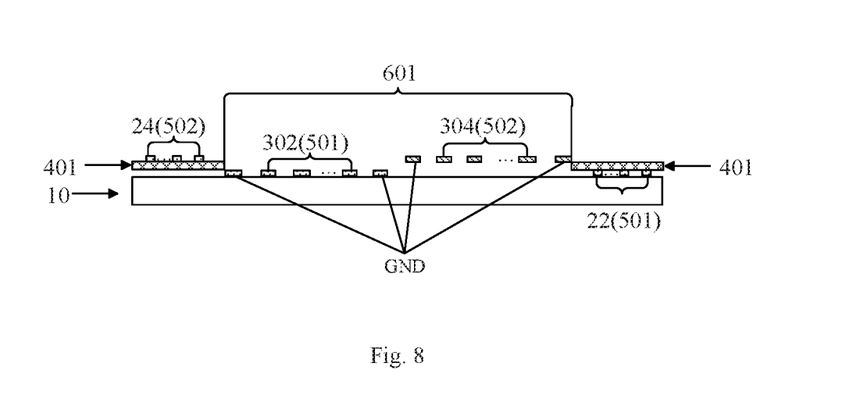
FIG. 8 illustrates cross-sectional views of the touch substrate illustrated in FIG. 1 along line D-D according to an embodiment of the present disclosure.

According to one embodiment of the present disclosure, the method for manufacturing the touch substrate (as illustrated in FIG. 1 and FIG. 8) may specifically include steps S201 to S206.

S201: forming a first conductive layer 501 on the substrate 10, wherein the first conductive layer 501 may be formed on the substrate 10 by a magnetron sputtering process for example. The material of the first conductive layer 501 may include metal or transparent conductive oxide.

S202: patterning the first conductive layer 501 to form the first touch electrode 1011, the first wiring 20, the second wiring 22, and the first pad 302. Specifically, the patterning may be made by a conventional photoetching method.

S203: forming a first insulating layer 401 on the first conductive layer 501.

S204: patterning the first insulating layer 401 to form an opening 601 exposing the first pad 302 in the bonding area 103.

S205: forming a second conductive layer 502 on the first insulating layer 401 in the same manner as S201, the manner is not repeated herein. The material of the second conductive layer 502 may include metal or transparent conductive oxide.

S206: patterning the second conductive layer 502 to form the second touch electrode 1012, the third wiring 24, the fourth wiring 26, and the second pad 304. The patterning process is the same as S202, which is not repeated herein.

It should be noted that other insulating layers may be formed on the second conductive layer 502 to prevent the touch substrate from being scratched.

The method provided by this embodiment is used for the touch substrate as illustrated in FIGS. 1 and 2 and described in the previous embodiments, and its structures, functions, and/or advantages are the same as those of the touch substrate in the previous embodiments, which are not repeated herein.

Figure 9:
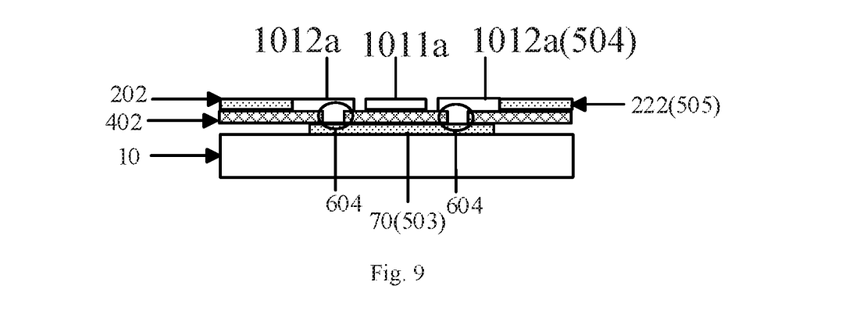
FIG. 9 illustrates cross-sectional views of the touch substrate illustrated in FIG. 1 along line F-F according to an embodiment of the present disclosure.

According to still another embodiment of the present disclosure, the first wiring may have a third portion and a fourth portion which are sequentially disposed along a connection path from the first touch electrode to the first pad, the second wiring may have a first portion and a second portion which are sequentially disposed along the connection path from the first touch electrode to the first pad, and the second portion of the second wiring intersects with the third wiring. The method for manufacturing the touch substrate (as illustrated in FIG. 1, FIG. 5, and FIG. 9) may specifically include steps S301 to S307.

S301: forming a third conductive layer 503 on the substrate 10 in the same manner as S201. The material of the third conductive layer 503 may include metal or transparent conductive oxide. Next, the third conductive layer 503 will be described by taking the transparent conductive oxide as an example.

S302: patterning the third conductive layer 503 to form the fourth portion 204 of the first wiring 20, the first pad 302, the second portion 224 of the second wiring 22, and a bridging portion 70 located in the touch area 101. The patterning process is the same as S202. In addition, the fourth portion 204 of the first wiring 20, the first pad 302, and the second portion 224 of the second wiring 22 are formed integrally to connect the first wiring 20 and the second wiring 22, which are connected to the same first touch electrode 1011, to the first pad 302.

S303: forming a second insulating layer 402 on the third conductive layer 503 in the same manner as S203. The second insulating layer 402 has a first opening 602 exposing the fourth portion 204 of the first wiring 20 and a second opening 603 exposing the second portion 224 of the second wiring 22.

S304: forming a fourth conductive layer 504 on the second insulating layer 402 in the same manner as S201. The material of the fourth conductive layer 504 may include metal or transparent conductive oxide. Next, the fourth conductive layer 504 will be described by taking the transparent conductive oxide as an example.

S305: patterning the fourth conductive layer 504 to form the first touch electrode 1011 and the second touch electrode 1012, and the patterning process is the same as S202. Specifically, the first touch electrode 1011 includes a plurality of first touch sub-electrodes 1011a connected directly, and the second touch electrode 1012 includes a plurality of second touch sub-electrodes 1012a arranged at intervals and connected by the bridging portion 70. In addition, the second insulating layer 402 has a third opening exposing 604 the second touch sub-electrodes 1012a.

S306: further forming a fifth conductive layer 505 on the second insulating layer 402 in the same manner as S201. The material of the fifth conductive layer 505 may include metal or transparent conductive oxide. Next, the fifth conductive layer 505 will be described by taking the metal as an example.

S307: patterning the fifth conductive layer 505 to form the third portion 202 of the first wiring 20, the first portion 222 of the second wiring 22, the third wiring 24, the fourth wiring 26, and the second pad 304, and the patterning process is the same as S202. The fourth portion 204 of the first wiring 20 is connected to the third portion 202 of the first wiring 20 via the first opening 602, the second portion 224 of the second wiring 22 is connected to the first portion 222 of the second wiring 22 via the second opening 603, and the second touch sub-electrodes 1012a are connected with each other by the bridging portion 70 via the third opening 604. It can be understood that if the material of the fifth conductive layer 505 is the same as that of the fourth conductive layer 504, the first touch electrode 1011, the second touch electrode 1012, the third portion 202 of the first wiring 20, the first portion 222 of the second wiring 22, the third wiring 24, the fourth wiring 26, and the second pad 304 can be formed simultaneously by forming and patterning only the fourth conductive layer 504.

It should be noted that other insulating layers may be formed on the fourth conductive layer and the fifth conductive layer to prevent the touch substrate from being scratched.

The method provided by this embodiment is used for the touch substrate as illustrated in FIGS. 1, 2, and 3 and described in the previous embodiments, and its structures, functions, and/or advantages are the same as those of the touch substrate in the previous embodiments, which are not repeated herein.

Figure 10:
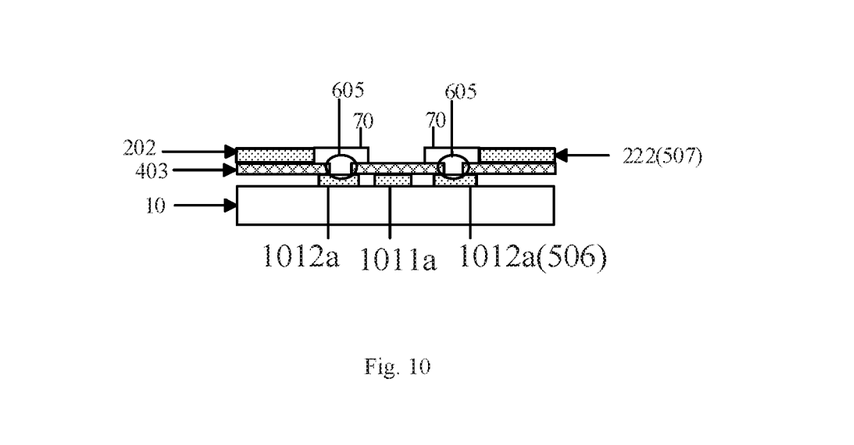
FIG. 10 illustrates cross-sectional views of the touch substrate illustrated in FIG. 1 along line F-F according to another embodiment of the present disclosure.

According to yet another embodiment of the present disclosure, the first wiring 20 may have a third portion 202 and a fourth portion 204 which are sequentially disposed along a connection path from the first touch electrode 1011 to the first pad 302, and the second wiring 22 may have a first portion 222 and a second portion 224 which are sequentially disposed along the connection path from the first touch electrode 1011 to the first pad 302. The method for manufacturing the touch substrate (as illustrated in FIG. 1, FIG. 5, and FIG. 10) may specifically include steps S401 to S405.

S405: forming a sixth conductive layer 506 on the substrate 10 in the same manner as S201. The material of the sixth conductive layer 506 may include metal or transparent conductive oxide. Herein, the sixth conductive layer 506 is described by taking the transparent conductive oxide as an example.

S402: patterning the sixth conductive layer 506 to form the first touch electrode 1011, the second touch electrode 1012, the fourth portion 204 of the first wiring 20, the first pad 302 and the second portion 224 of the second wiring 22, and the patterning process is the same as S202. The fourth portion 204 of the first wiring 20, the first pad 302, and the second portion 224 of the second wiring 22 are integrally formed to connect the first wiring 20 and the second wiring 22, which are connected to the same first touch electrode 1011, to the first pad 302. The first touch electrode 1011 includes a plurality of first touch sub-electrodes 1011a connected directly, and the second touch electrode 1012 includes a plurality of second touch sub-electrodes 1012a arranged at intervals.

S403: forming a third insulating layer 403 on the sixth conductive layer 506 in the same manner as S203. The third insulating layer 403 has a fourth opening 602 (the same as the first opening 602) exposing the fourth portion 204 of the first wiring 20, a fifth opening 603 (the same as the second opening 603) exposing the second portion 224 of the second wiring 22, and a sixth opening 605 exposing the second touch sub-electrodes 1012a.

S404: forming a seventh conductive layer 507 on the third insulating layer 403 in the same manner as S201. The material of the seventh conductive layer 507 may include metal or transparent conductive oxide. Herein, the seventh conductive layer 507 is described by taking the metal as an example.

S405: patterning the seventh conductive layer 507 to form a bridging portion 70 located in the touch area 101, the third portion 202 of the first wiring 20, the first portion 222 of the second wiring 22, the third wiring 24, the fourth wiring 26 and the second pad 304, and the patterning process is the same as S202. The fourth portion 204 of the first wiring 20 is connected to the third portion 202 of the first wiring 20 via the fourth opening 602, the second portion 224 of the second wiring 22 is connected to the first portion 222 of the second wiring 22 via the fifth opening 603, and the second touch sub-electrodes 1012a are connected with each other by the bridging portion 70 via the sixth opening 605.

It should be noted that other insulating layers may be formed on the fourth conductive layer and the fifth conductive layer to prevent the touch substrate from being scratched.

The method provided by this embodiment is used for the touch substrate as illustrated in FIGS. 1, 2, 4, and 5 and described in the previous embodiments, and its structures, functions, and/or advantages are the same as those of the touch substrate in the previous embodiments, which are not repeated herein.

Figure 7:
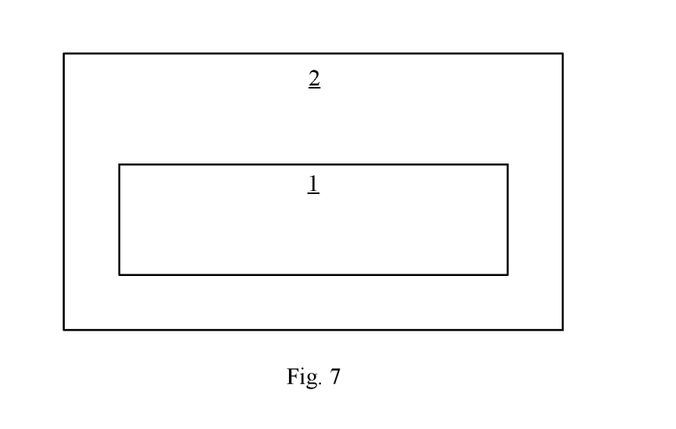
FIG. 7 illustrates a schematic diagram of a display device according to an embodiment of the present disclosure.

In yet another aspect of the present disclosure, there is further provided a display device including the touch substrate described in the previous embodiments. FIG. 7 illustrates a schematic diagram of a display device according to an embodiment of the present disclosure. As illustrated in FIG. 7, the display device 2 according to the present disclosure includes the aforementioned touch substrate 1. By connecting the wirings, which are connected to a same touch electrode, to a same pad, the number of the pads on the touch substrate can be reduced, thereby saving the space and decreasing the cost of the display device.

The foregoing descriptions of the embodiments have been provided as above for the purposes of illustration and description, and they are not intended to be exhaustive or to limit this application. Various elements or features of a particular embodiment are generally not limited to that particular embodiment, but where applicable, they are interchangeable and can be used in a selected embodiment, even if not specifically illustrated or described. Similarly, changes may also be made in many ways. Such changes cannot be considered as departures from this application, and all the modifications are included in the scope of this application.

What is claimed is:

1. A touch substrate comprising:
   a substrate having a touch area, a peripheral area surrounding the touch area, and a bonding area located in the peripheral area, wherein the touch area includes a first side and a second side opposite to each other, and a third side and a fourth side opposite to each other, and wherein the bonding area has a fifth side opposite to the fourth side and a sixth side opposite to the fifth side;
   a first touch electrode and a second touch electrode disposed on the substrate and located in the touch area;
   a first wiring and a second wiring disposed on the substrate and located in the peripheral area, wherein the first wiring is connected to the first touch electrode via the first side, and wherein the second wiring is connected to the first touch electrode via the second side;
   a third wiring and a fourth wiring disposed on the substrate and located in the peripheral area, wherein the third wiring is connected to the second touch electrode via the third side, and wherein the fourth wiring is connected to the second touch electrode via the fourth side; and
   a pad disposed along the fourth side and located in the bonding area,
   wherein the first wiring is connected to a first pad of the pad via the fifth side, wherein the fourth wiring is connected to a second pad of the pad via the fifth side, wherein the second wiring connected to a same touch electrode as the first wiring is connected to the first pad via the sixth side, and wherein the third wiring connected to a same touch electrode as the fourth wiring is connected to the second pad via the sixth side.

2. The touch substrate according to claim 1, wherein the first wiring and the fourth wiring do not intersect with each other, and wherein the second wiring and the third wiring are disposed to be intersected with each other and insulated from each other.

3. The touch substrate according to claim 2, wherein the first touch electrode and the second touch electrode are disposed on different layers, wherein the first wiring and the second wiring are disposed on a same layer as the first touch electrode, and wherein the third wiring and the fourth wiring are disposed on a same layer as the second touch electrode.

4. The touch substrate according to claim 3, wherein the first pad is disposed on a same layer as the first wiring and the second wiring, and wherein the second pad is disposed on a same layer as the third wiring and the fourth wiring.

5. The touch substrate according to claim 2, wherein the first touch electrode is disposed on a same layer as the second touch electrode.

6. The touch substrate according to claim 5, wherein the second wiring has a first portion and a second portion which are sequentially disposed along a connection path from the first touch electrode to the first pad, wherein the first portion and the second portion are disposed on different layers, wherein the second portion intersects with the third wiring, and wherein the first portion is disposed on a same layer as the third wiring.

7. The touch substrate according to claim 6, wherein the first wiring has a third portion and a fourth portion which are sequentially disposed along the connection path from the first touch electrode to the first pad, wherein the third portion and the fourth portion are disposed on different layers, wherein the third portion and the fourth wiring are disposed on a same layer as the first portion and the third wiring, and wherein the fourth portion is disposed on a same layer as the second portion.

8. The touch substrate according to claim 7, wherein the first pad is disposed on a same layer as the fourth portion and the second portion, and wherein the second pad is disposed on a same layer as the third wiring and the fourth wiring.

9. The touch substrate according to claim 8, wherein vertical projections of the third portion and the fourth portion on the substrate at least partially overlap with each other, and wherein vertical projections of the first portion and the second portion on the substrate at least partially overlap with each other.

10. The touch substrate according to claim 1, wherein the second wiring and the third wiring vertically intersect with each other.

11. A method for manufacturing a touch substrate, the method comprising:
    providing a substrate having a touch area, a peripheral area surrounding the touch area, and a bonding area located in the peripheral area, wherein the touch area includes a first side and a second side opposite to each other, and a third side and a fourth side opposite to each other, wherein the bonding area is opposite to the fourth side, and wherein the bonding area has a fifth side opposite to the fourth side and a sixth side opposite to the fifth side;
    forming a first touch electrode and a second touch electrode on the substrate and in the touch area;
    forming a first wiring and a second wiring on the substrate and in the peripheral area, wherein the first wiring and the second wiring are connected to the first touch electrode via the first side and the second side, respectively;
    forming a third wiring and a fourth wiring on the substrate and in the peripheral area, wherein the third wiring and the fourth wiring are connected to the second touch electrode via the third side and the fourth side, respectively; and
    forming a pad along the fourth side in the bonding area,
    wherein the first wiring and the fourth wiring are connected to a first pad and a second pad of the pad via the fifth side of the bonding area, respectively, wherein i) the second wiring connected to a same touch electrode as the first wiring and in the third wiring connected to a same touch electrode as the fourth wiring are connected to the first pad and the second pad, respectively, via the sixth side of the bonding area.

12. The method according to claim 11, wherein the first wiring and the fourth wiring do not intersect with each other, and wherein the second wiring and the third wiring are disposed to be intersected with each other and insulated from each other.

13. The method according to claim 12, the method comprising:
    forming a first conductive layer on the substrate;

patterning the first conductive layer to form the first touch electrode, the first wiring, the second wiring, and the first pad;

forming a first insulating layer on the first conductive layer;

patterning the first insulating layer to form an opening exposing the first pad in the bonding area;

forming a second conductive layer on the first insulating layer; and patterning the second conductive layer to form the second touch electrode, the third wiring, the fourth wiring, and the second pad.

14. The method according to claim 12, wherein the first wiring has a third portion and a fourth portion which are sequentially disposed along a connection path from the first touch electrode to the first pad, wherein the second wiring has a first portion and a second portion which are sequentially disposed along the connection path from the first touch electrode to the first pad, wherein the second portion intersects with the third wiring, and wherein the method includes:

forming a third conductive layer on the substrate;

patterning the third conductive layer to form the fourth portion, the first pad, the second portion, and a bridging portion located in the touch area, wherein the fourth portion, the first pad, and the second portion are integrally formed;

forming a second insulating layer on the third conductive layer, wherein the second insulating layer has a first opening exposing the fourth portion and a second opening exposing the second portion;

forming a fourth conductive layer on the second insulating layer;

patterning the fourth conductive layer to form the first touch electrode and the second touch electrode, wherein the first touch electrode includes a plurality of first touch sub-electrodes connected directly, wherein the second touch electrode includes a plurality of second touch sub-electrodes arranged at intervals, wherein the second touch sub-electrodes are connected by the bridging portion, and wherein the second insulating layer has a third opening exposing the second touch sub-electrodes;

further forming a fifth conductive layer on the second insulating layer; and patterning the fifth conductive layer to form the third portion, the first portion, the third wiring, the fourth wiring, and the second pad, wherein the fourth portion is connected to the third portion via the first opening, wherein the second portion is connected to the first portion via the second opening, and wherein the second touch sub-electrodes are connected to each other by the bridging portion via the third opening.

15. The method according to claim 12, wherein the first wiring has a third portion and a fourth portion which are sequentially disposed along a connection path from the first touch electrode to the first pad, wherein the second wiring has a first portion and a second portion which are sequentially disposed along the connection path from the first touch electrode to the first pad, and wherein the method includes:

forming a sixth conductive layer on the substrate;

patterning the sixth conductive layer to form the first touch electrode, the second touch electrode, the fourth portion, the first pad, and the second portion, wherein the fourth portion, the first pad, and the second portion are integrally formed, wherein the first touch electrode includes a plurality of first touch sub-electrodes connected directly, and wherein the second touch electrode includes a plurality of second touch sub-electrodes arranged at intervals;

forming a third insulating layer on the sixth conductive layer, wherein the third insulating layer has a fourth opening exposing the fourth portion, a fifth opening exposing the second portion, and a sixth opening exposing the second touch sub-electrodes;

forming a seventh conductive layer on the third insulating layer; and patterning the seventh conductive layer to form a bridging portion located in the touch area, the third portion, the first portion of the second wiring, the third wiring, the fourth wiring, and the second pad, wherein the fourth portion is connected to the third portion via the fourth opening, wherein the second portion is connected to the first portion via the fifth opening, and wherein the second touch sub-electrodes are connected to each other by the bridging portion via the sixth opening.

16. A display device comprising the touch substrate according to claim 1.

17. A display device comprising the touch substrate according to claim 2.

18. A display device comprising the touch substrate according to claim 3.

19. A display device comprising the touch substrate according to claim 4.

20. A display device comprising the touch substrate according to claim 5.

* * * * *

UNITED STATES PATENT AND TRADEMARK OFFICE
CERTIFICATE OF CORRECTION

PATENT NO. : 11,216,125 B2
APPLICATION NO. : 16/339099
DATED : January 4, 2022
INVENTOR(S) : Shifeng Xu et al.

Page 1 of 1

It is certified that error appears in the above-identified patent and that said Letters Patent is hereby corrected as shown below:

In the Claims

Claim 11, Column 14, Line 56, "and in the third" should read -- and ii) the third --.

Signed and Sealed this
Twelfth Day of April, 2022

Drew Hirshfeld
*Performing the Functions and Duties of the
Under Secretary of Commerce for Intellectual Property and
Director of the United States Patent and Trademark Office*